(No Model.)
G. C. MILLER.
PLOW FENDER.
No. 311,909. Patented Feb. 10, 1885.
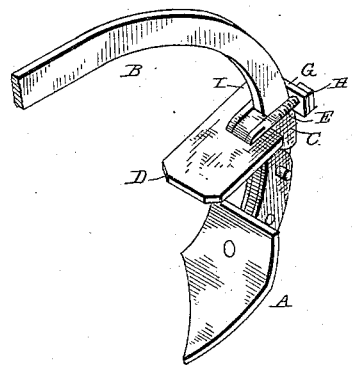
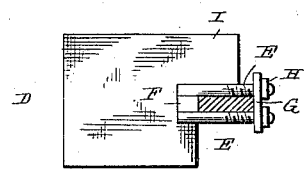
WITNESSES
Edwin L. Jewell.
J. J. McCarthy.
INVENTOR
Gilbert C. Miller
By _____
Attorney

UNITED STATES PATENT OFFICE.

GILBERT C. MILLER, OF FORT WAYNE, INDIANA.

PLOW-FENDER.

SPECIFICATION forming part of Letters Patent No. 311,909, dated February 10, 1885

Application filed April 11, 1884. (No model.)

*To all whom it may concern:*

Be it known that I, GILBERT C. MILLER, a citizen of the United States, residing at Fort Wayne, in the county of Allen and State of Indiana, have invented certain new and useful Improvements in Plow-Fenders, of which the following is a specification, reference being had therein to the accompanying drawings.

My invention relates to fenders to be attached to the plow-beams of cultivators, and is designed to break the throw of the earth as it leaves the plow, and thus prevent it breaking down the growing crop or covering the same. It also "hills" the crop, as the plow can be forced deep in the earth, and the fender or guard will prevent the said earth from covering the crop, while it forces the earth into hills around it.

In the drawings, Figure 1 represents a perspective of the device attached to a left-hand plow-beam of a cultivator; Fig. 2, a plan view of the fender, with the plow-beam in section.

A represents an ordinary plow-shovel attached to a beam, B, the said beam to be attached to a cultivator. On the beam, above the attached plow-shovel, are pieces C, which restrict the downward adjustment of the fender on the beam. The fender D is attached to the beam by means of two rods or bolts, E, screw-threaded on their outer ends. On the fender, between the bolts, is a projection, F, which bears against the beam and causes the said fender to move smoothly on it. The bolts pass one on each side of the beam and through a plate, G, which bears against the beam. Outside the plate the bolts are provided with nuts H, which hold, by being tightened or loosened, the fender in place and allow its adjustment on the said beam. One side of the fender is elongated at I, to better engage with the plowed earth.

The fenders are made both right and left handed.

It will be seen that the fender prevents the dirt being thrown one side so as to injure the crop, but just to one side of the plow-shovel, so as to hill the earth nicely around the said crop.

Having described my invention, what I claim is—

1. A fender for cultivator-plows, consisting of a plate which projects over the plow-shovel, and has one side elongated to pass rearward on one side of the plow-beam, the said plate being adjustably connected to the said plow-beam, substantially as and for the purpose specified.

2. A plow-fender for cultivator-plows, consisting of a plate which projects over the plow-shovel, and has one side elongated, in combination with a plow-beam having a stop secured to it above the shovel, the fender-plate being adjustably secured to the said beam, and the parts operating substantially as and for the purpose specified.

3. A plow-fender consisting of a plate with an elongated side and having two bolts secured to it, having between their rear ends a bearing secured to the fender-plate, and their free ends passing through a bearing-plate, in combination with a plow-beam having a stop on it above the plow-shovel, the several parts operating substantially as and for the purpose specified.

4. A plow-fender consisting of a plate one side of which is elongated, the said plate having two bolts secured to it, having between their rear ends a bearing, and their other ends passing through a plate which bears against the plow-beam, the whole being adjustable thereon, and operating as and for the purpose specified.

In testimony whereof I affix my signature in presence of two witnesses.

GILBERT C. MILLER.

Witnesses:
W. J. KERR,
C. CLIFTON KERR.